Sept. 13, 1949.　　　　B. R. ABBOTT　　　　2,481,486
ROTARY MOLDING MACHINE

Filed April 10, 1943　　　　　　　　　　　　　　8 Sheets-Sheet 1

Fig. 1

Sept. 13, 1949. B. R. ABBOTT 2,481,486
ROTARY MOLDING MACHINE
Filed April 10, 1943 8 Sheets-Sheet 3

Fig. 3

Inventor
Boyd R Abbott
by
Walter & Kaufman
Attorney

Sept. 13, 1949.　　　　B. R. ABBOTT　　　　2,481,486
ROTARY MOLDING MACHINE

Filed April 10, 1943　　　　　　　　　　8 Sheets-Sheet 4

Inventor
Boyd R Abbott
by
Walter & Kaufman
Attorney

Sept. 13, 1949.   B. R. ABBOTT   2,481,486
ROTARY MOLDING MACHINE
Filed April 10, 1943   8 Sheets-Sheet 5

Inventor
Boyd R. Abbott
by
Walter & Kaufman
Attorney

Sept. 13, 1949.  B. R. ABBOTT  2,481,486
ROTARY MOLDING MACHINE
Filed April 10, 1943  8 Sheets-Sheet 6

Inventor
Boyd R. Abbott
by
Walter & Kaufman
Attorney

Sept. 13, 1949.　　　B. R. ABBOTT　　　2,481,486
ROTARY MOLDING MACHINE Filed April 10, 1943　　　　　　　　　8 Sheets-Sheet 7

Inventor
Boyd R. Abbott
by
Walter & Kaufman
Attorney

Patented Sept. 13, 1949

2,481,486

UNITED STATES PATENT OFFICE 2,481,486

ROTARY MOLDING MACHINE

Boyd R. Abbott, Norristown, Pa., assignor to Armstrong Cork Company, Lancaster, Pa., a corporation of Pennsylvania Application April 10, 1943, Serial No. 482,645

3 Claims. (Cl. 92—61)

This invention relates to a machine for forming mineral wool insulating blocks and the like from a liquid slurry. It is useful for other similar purposes, such, for example, as in the manufacture of pipe covering and fitting covers, and other articles which may be desirably produced from a liquid slurry by a molding or forming operation in which felting occurs by drainage of a substantial portion of the liquid from the slurry. The field of usefulness of the machine is not limited for it may be adapted for the production of articles of a great variety of sizes and shapes, utilizing a liquid slurry in formation.

In the embodiment illustrated in the drawings, the machine is arranged for the production of insulating blocks of mineral wool, paper pulp, and a binder. As there shown, the forming molds are arranged in a train and are conveyed in a closed path to bring the molds intermittently into a plurality of operating stations along the path of travel. At these stations, various operations incidental to the formation of the product are sequentially performed. The arrangement provides for the simultaneous performance of different operations at the various stations so that upon each intermittent move of the machine a complete article is formed and, with sixteen molds as shown in the drawings, sixteen completely formed blocks are produced upon each revolution of the machine. The apparatus provided at each station to perform the various functions is substantially automatic in operation so that a relatively compact machine of substantial capacity may be operated with a minimum of machine operators.

The machine includes a number of unique features which alone and in combination with other elements result in a machine which economically produces a uniform product having desirable physical characteristics. Important among the features is the mold arrangement whereby a dilute slurry may be employed and drainage occurs substantially uniformly through the perforate bottom of the mold resulting in a product of a density which does not vary greatly in any portion of the finished block and in a product having an unusually high modulus of rupture for mineral wool insulation. Another improvement which makes the machine particularly useful in the formation of relatively large molded bodies such as insulation slabs three feet square by four inches thick is the lift arrangement which is effective for sequentially removing the filling booths, which in effect constitute upward extensions of the molds, from the molds and placing them on a conveyor for delivery to a subsequent station where the booths are lifted by a similar device and repositioned upon the mold. The provision of hinged mold bodies which may be rotated to discharge the formed articles is another feature of considerable utility. It eliminates a burdensome hand operation now common in mineral wool board manufacture.

The machine also includes a novel arrangement for connecting the molds together for movement in unison. The arrangement provides for minute adjustment of the molds so that each will be properly positioned at the various operating stations upon intermittent movement of the machine. All of the tiresome lifting and handling operations heretofore performed by workmen are eliminated in this machine which fully automatically measures and charges the slurry, removes the filling booth, compresses the mass, discharges the completed block, and carries the filling booth from the place of removal to a station subsequent to the discharge station where it automatically reassembles the booth and mold.

There are many other features and novel combinations which will be apparent upon a full consideration of the description which follows. The invention will be readily understood from the drawings which are attached and from the detailed description. In the drawings which illustrate a typical embodiment of the invention:

Figure 1:
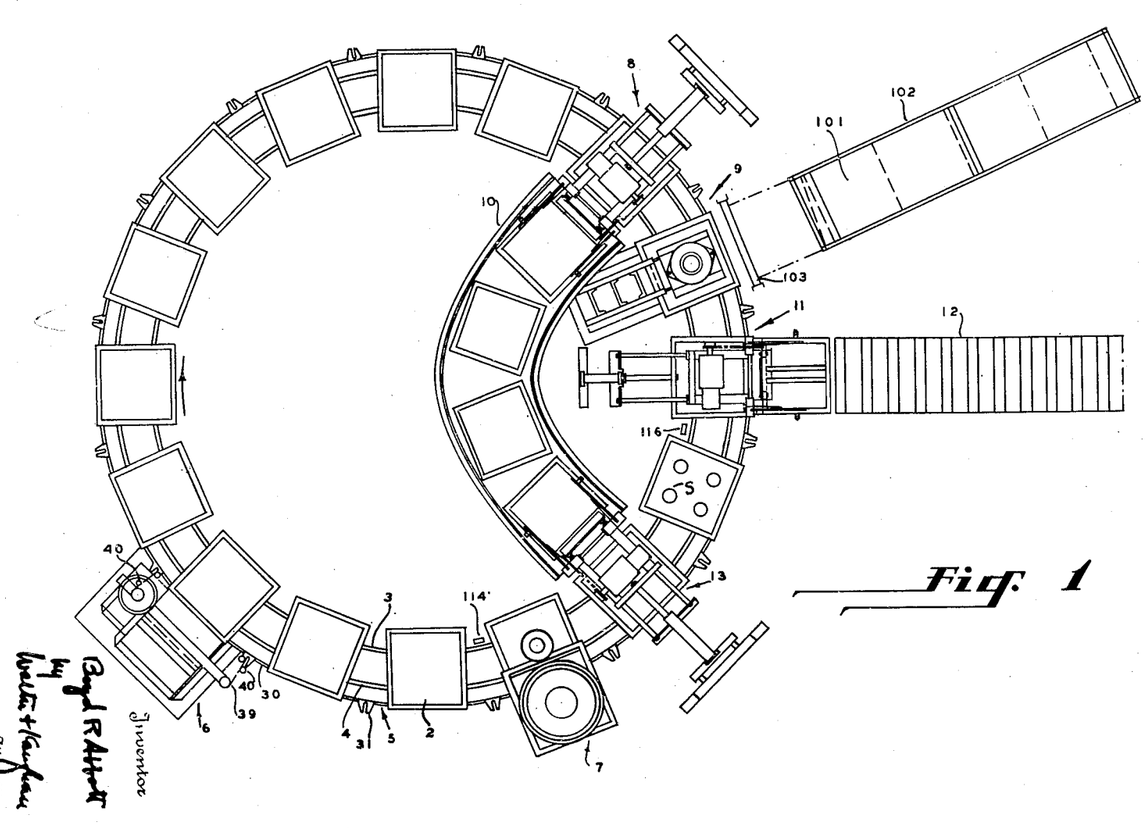
Figure 1 is an outline view intended primarily to show the general arrangement of the machine.

The general arrangement of the device is shown in Figure 1. As there shown, the machine includes a plurality of molds 2, 16 being shown in this illustration. The molds 2 are mounted on carriages and are rotatable in a closed path over tracks 3 and 4. The molds are connected together by a circular drive band 5 attached to the carriages and through this band an intermittent motion is imparted to the train of molds by a drive arrangement generally indicated at 6.

There is positioned along the path of movement of the molds 2, a filling device at station 7 which is effective for uniformly depositing a measured quantity of slurry into the molds 2 as they are sequentially presented to it. The bottom of each mold is pervious and as each charged mold travels along its path, water is drained from the slurry, reducing the consistency to a considerable degree. The upper portion of each mold 2 takes the form of a removable filling booth which receives the slurry as initially charged and when the greater portion of the water has been drained off, the mold comes to rest at a station along its path of travel and there the filling booth is removed by the lifting arrangement at station 8. A gravity roller conveyor 10 is positioned inside the path of travel of the molds and is used to convey the filling booths from the removing station 8 to a position just in advance of the filling station 7. The mold is then moved to another station where pressure is applied by a hydraulic press at station 9 to express further water and reduce the body to the desired shape and density.

After the mass has been compressed in its mold, the mold is moved to an unloading station 11 where a mold turn-over is provided for rotating the mold (with the filling booth removed) through an angle of about 180° and the molded block on a drying pallet is discharged by gravity onto a roller loading conveyor 12 and moved to a loading device, positioned on drying cars, and then carried through a drying oven.

After discharge of the molded mass, the mold is returned to its initial position by the turn-over at station 11. The screen in the bottom of the mold may then be washed if necessary to remove any material which may be embedded in the interstices. The mold then proceeds to a station 13 where a lift, similar to the lift at station 8, picks up a filling booth and positions it on the mold 2. The mold 2 next moves to the filling station 7 and the operation is repeated.

Figure 1 is intended to show only the general arrangement of the machine. The molds and filling booths, machine drive arrangement, filling device, filling booth lifts, hydraulic press, mold turn-over, and conveyors will be described in detail, referring to other drawings.

Mold and filling booths

Figure 7:
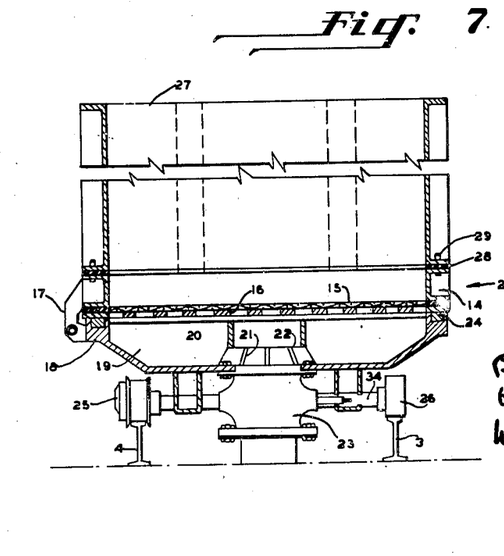
Figure 7 is a sectional view of one of the molds with the discharge valve shown in elevation for sake of clarity.

The mold and filling booth arrangement is shown in section in Figure 7. The mold shown in this view is of square horizontal section, adapted, for example, for the production of a finished block about 36" x 36" x 4". The size and shape of the mold will vary with the article to be formed.

Each mold 2 consists of an open topped body 14 having a perforate bottom 15, 10 x 10 bronze mesh screen being satisfactorily used for this purpose. The screen is supported by a perforate plate 16 which may be omitted if the screen 15 is of sufficient strength and rigidity to support the mass during formation. The mold is connected by a pair of hinges 17 (one being shown in Figure 7) to a carriage 18 in the form of a fluidtight chamber 19 braced by reinforcing elements 20, 2 and 22. The chamber 19 opens into a large discharge valve 23. The purpose and operation of the valve 23 will be described in greater detail in connection with Figures 16 and 17. A fluidtight joint is provided between the mold body 14 and the carriage chamber 19 by a gasket 24.

The carriages are mounted on two pairs of wheels 25 and 26 which run on the tracks 3 and 4. The driving arrangement which connects with the axles of wheels 25 has been eliminated in this view for the sake of clarity.

A filling booth 27 is removably secured to each mold 2. Booth 27 is open both at top and bottom but forms a fluidtight joint with the mold 2 through a compressible gasket 28. In effect, the booth 27 forms an upward extension of the mold 2 adapted to receive the slurry charged at the filling station 7. The slurry is not very concentrated and a relatively large volume is required for each molded block. It is necessary, therefore, to provide a chamber above the mold 2 which will receive a large measured quantity of slurry. As the water drains out of the slurry, its volume decreases and when a major portion of the water has drained off, the mass is disposed substantially wholly within the mold 2. The filling booth 27 is then removed at station 8, prior to the application of pressure to the mass to express additional water. Four guide pins 29 which are secured to the mold 2 serve to hold the booth 27 in position but permit its removal by the lift at station 8 after the desired quantity of water has been drained off.

The drive arrangement

The mold carriages 18 are mounted to be moved intermittently to bring each carriage and its associated mold and filling booth sequentially into each operating station. In the rotary machine shown, this is effected through an arrangement which will be clear from an examination of Figures 1, 12, 13, 14, and 15. Figure 1 shows a drive band 5 which connects each of the molds 2 in predetermined spaced relationship so that motion imparted to the band 5 imparts a coincidental motion to the train of molds and mold carriages. The drive band 5 is formed in curved segments 30 extending from the center line of one drive lug 31 to the center line of the next drive lug 31. The adjacent segments are joined together into a continuous band by plates 32 to which the lugs 31 are welded (see Figure 14). Bolts 33 pass through the band segments 30 and the lug plates 32 to secure the elements together.

Figures 12, 13, 14, 15:
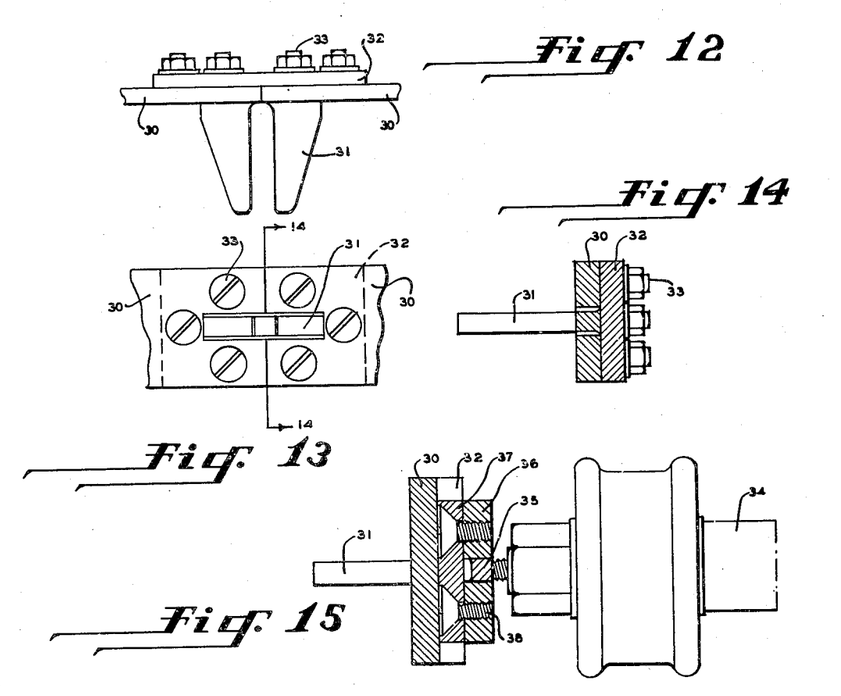
Figure 12 is a detail view showing one of the drive lugs and illustrating the method of joining the drive band segments.
Figure 13 is a front elevation of the lug shown in Figure 12.
Figure 14 is a sectional view taken on the line 14—14 of Figure 13.
Figure 15 is a detail view partly in section showing the carriage adjustment arrangement.

The mold carriages are connected to the drive band 5 by the arrangement shown in Figure 15. The outer end of each of the two axles 34 for each carriage 18 is drilled and tapped to receive a stud 35 which is welded to a small square adjusting plate 36. Each pair of adjusting plates 36 is attached to a connecting plate 37 which spans the space between the two axles on each carriage 18. Machine screws 38 serve to hold the plates 36 and 37 together. In assembly of the machine, the two adjusting plates 36 for each carriage 18 are screwed to approximately the proper position and the connecting plate 37 is positioned. If the assembly is not concentric, one or the other or both of the adjusting plates 36 are screwed in or out and when proper concentricity has been obtained, the adjusting plates 36 are attached to the connecting plate 37 by the screws 38. The connecting plate 37 is then attached to the drive band segment 30 by means of bolts (not shown in Figure 15). A similar procedure is followed for each of the sixteen carriages in the train.

With this arrangement, each carriage is properly positioned both radially and circumferentially so that as each mold is presented to the various operating stations, proper alignment is obtained with the lifts, press, turn-over device, and filling mechanism, located in the path of travel of the train of molds.

In Figure 1, a driving arrangement generally indicated at 6 is provided for imparting intermittent or stepwise rotation to the molds through the drive band 5. This drive consists essentially of a driven chain 39 which carries two driving pins 40 adapted to enter the slotted openings in the driving lugs 31. It will be noted that the chain in a portion of its path of travel is directed radially of the machine so that as the pin 40 moves from the position shown in Figure 1 toward the center of the machine it will enter the opening in the lug 31 and, as the chain continues its motion, the pin 40 will rotate the drive band 5 in a clockwise direction as indicated by the arrow in Figure 1. When a distance equivalent to the distance between lugs 31 has been travelled, pin 40 will move radially again, disengaging from the drive lug 31. An electrical control arrangement is preferably provided to time the motion of the machine, starting and stopping the motor which drives the chain. This may be accomplished manually, however.

The driving apparatus is shown in more detail in my copending application Serial No. 482,644, filed April 10, 1943, now Patent No. 2,404,156, issued July 16, 1946 and entitled "Machine drive."

The particular form which the driving mechanism takes is not important and in itself constitutes no part of the present invention, except as part of the combination. As previously stated, any driving mechanism which will impart the desired intermittent motion to the machine will be satisfactory.

The measuring and filling device

Figure 2:
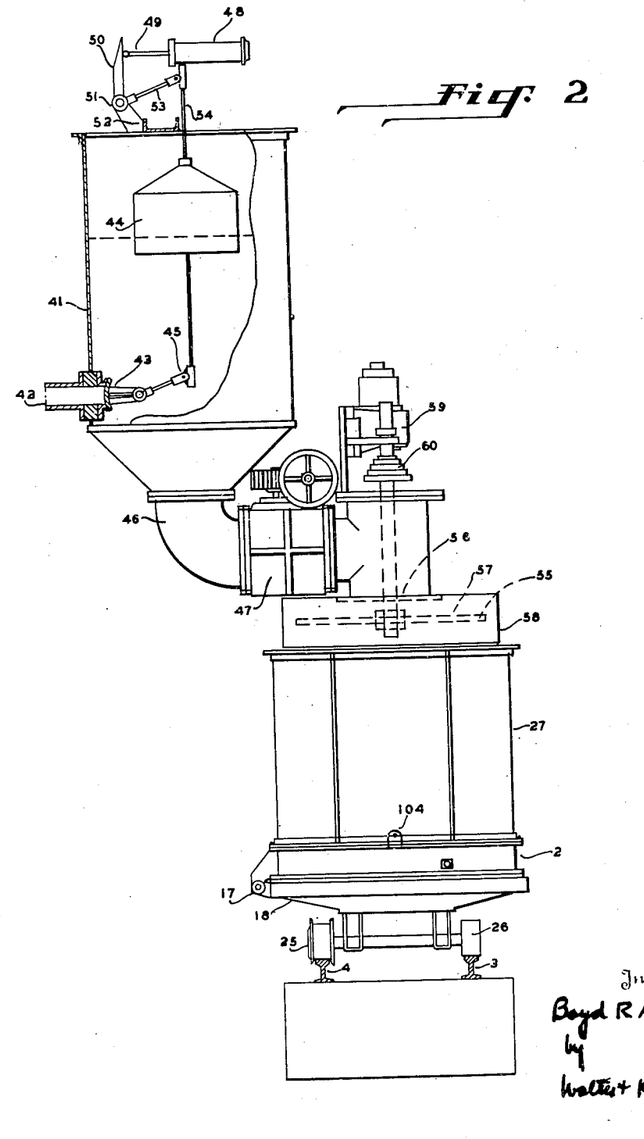
Figure 2 is a side elevation partly broken away showing the measuring and filling device in position to discharge slurry into one of the molds.

The measuring and filling device is shown in Figure 2 and is effective for depositing a measured quantity of slurry into each mold as it is presented at the filling station 7. The filling device per se does not constitute part of my invention and a similar measuring and filling device suitable for my purpose is more completely described and illustrated in the copending application of John D. Lyall, Serial No. 482,642, filed April 10, 1943, now Patent No. 2,385,092, issued September 18, 1945 and entitled "Measuring and discharging device." The device shown comprises essentially a measuring tank 41 having an inlet opening 42 controlled by a valve 43 actuated by a float 44 through a linkage 45. The tank 41 is provided with a discharge connection 46 controlled by an air operated valve 47. The tank 41 is shown in Figure 2 in filled position prior to discharge. There is provided an arrangement for holding the float 44 in elevated position and in the embodiment shown this takes the form of an air cylinder 48 having a piston controlled push rod 49 adapted to engage an arm 50 keyed to a shaft 51 journalled in a bracket 52. A control arm 53 is secured to a rod 54 which carries and is actuated by float 44. The arm 53 is keyed to the shaft 51 which is common for both the arms 50 and 53 so that if movement of arm 50 is arrested, concomitant motion of arm 53 is likewise arrested and the rod 54 which carries the float 44 is held against downward motion. The purpose of this is to prevent the valve 43 from opening until after complete discharge of the contents of the tank 41 has been effected through valve 47. Otherwise, as the contents were discharged, the float 44 would fall and inlet valve 43 would be opened permitting the flow of slurry from the supply source into the tank and preventing the supply of a precisely measured quantity of slurry to the mold.

Air cylinder 48 is interconnected with the air cylinder of the valve 47 so that, when valve 47 is closed, push rod 49 of air cylinder 48 is retracted, permitting arm 50 to move in a clockwise direction and float 44 to drop. Float 44 controls the operation of valve 43 and when float 44 drops, valve 43 opens, whereupon, slurry from the source of supply enters the tank 41 elevating the float 44. When the desired quantity has been received, automatic closing of valve 43 is effected as previously described. Thus, measured quantities of slurry are received in the tank 41 for discharge into the molds as they sequentially come to rest in the filling station.

In order to uniformly discharge the slurry and avoid any possible segregation of the fibers, a rotating plate 55 is provided below the discharge opening 56. This plate is provided with perforations 57 and, is of such size that a space is provided between the outer edge of the plate 55 and a spray shield 58. The slurry may flow through the perforations and over the edge. The plate 55 is driven by a motor 59 through pulleys 60. The plate 55 may be rotated continuously but is preferably so controlled that it operates only when the valve 47 is opened and the slurry is being discharged from the tank 41 through the discharge opening 56.

The filling booth lifts

There are two filling booth lifts embodied in the machine, one at station 8 where the booths are removed from the molds prior to pressing and one at station 13 where the booths are replaced on the molds after discharge of the completed blocks and prior to the charging of the molds with fresh quantities of slurry.

The details of the lifts are shown in Figures 3, 4, 6, and 11. The same general arrangement is used for each of the lifts at stations 8 and 13 although minor differences in the lifting arms and hooks are made to compensate for the difference in levels from the discharge position of the filling booth onto the conveyor 10 at station 8 to the receiving position at station 13, the conveyor 10 being a gravity type roller conveyor and being inclined downwardly from station 8 to station 13.

Figure 3:
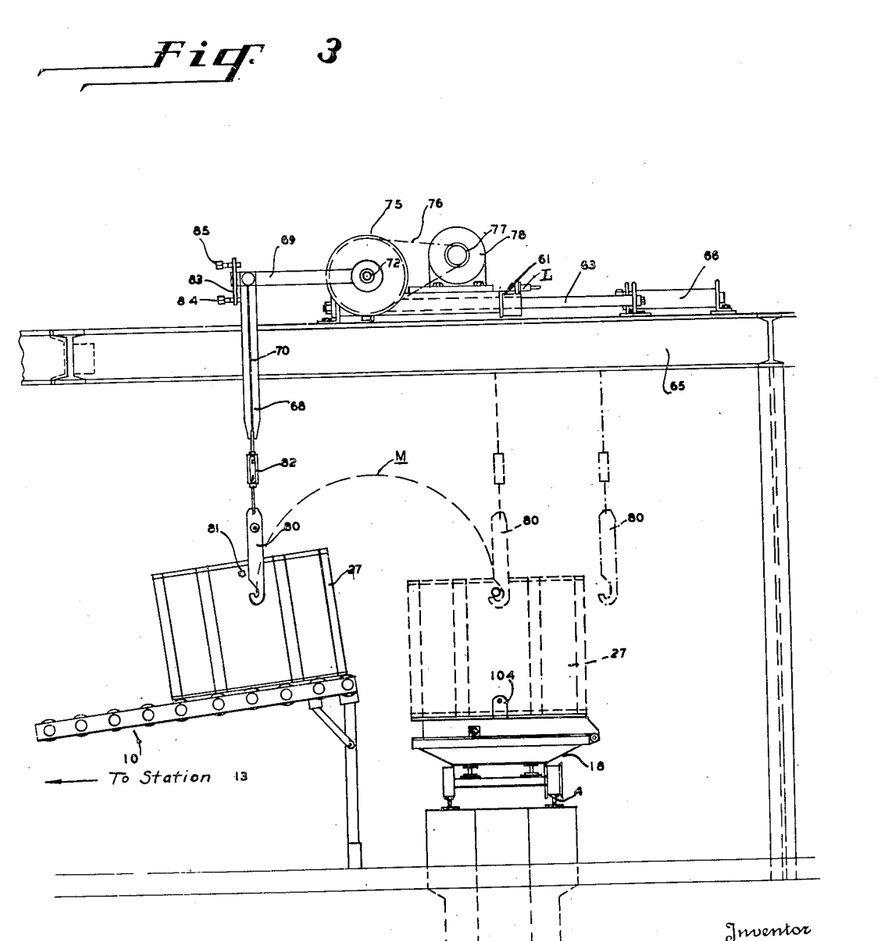
Figure 3 is a side elevation showing a filling booth lift.

The lift at station 8 is illustrated in Figure 3 in the position it assumes after removing a filling booth 27 and positioning it on the gravity conveyor 10 for delivery to the lift at station 13. It will be understood from the description which follows that the molds are moved into position sequentially and the lift is retracted on a traversing mechanism between each intermittent motion of the machine so as to bring the lift and its associated mechanism out of the path of travel of the molds.

Figure 6:
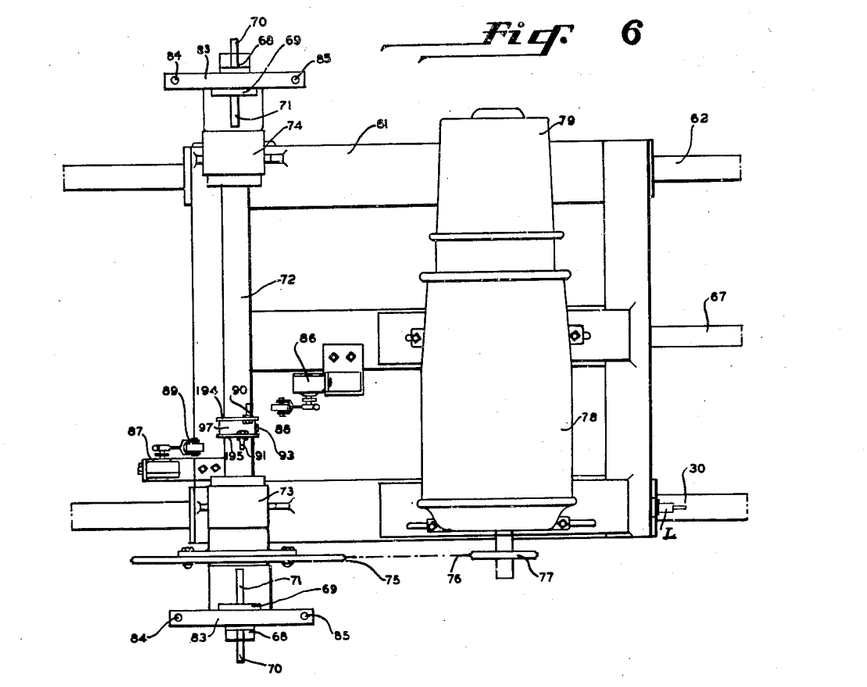
Figure 6 is a top plan view of the lift and turn-over mechanism, showing the control arrangement of Figure 4.
Figure 11:
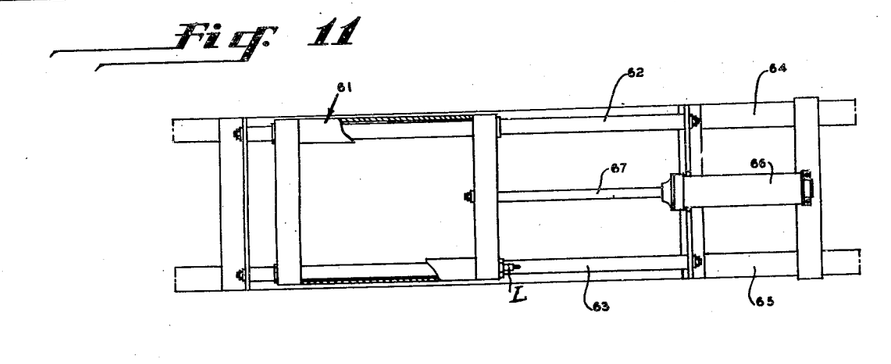
Figure 11 is a top plan view of the filling booth lift and mold turn-over carriage with the lifting and turning mechanism removed to show the details of carriage structure.

Referring to Figures 6 and 11, it will be noted that the lifting mechanism is mounted upon a carriage 61 (the lifting mechanism has been omitted in Figure 11 to clearly show the carriage and traversing arrangement). The carriage 61 is arranged to slide horizontally on guide bars 62 and 63 which are in turn suitably supported above the path of travel of the molds. The carriage 61 is shown in operating position in Figures 3 and 11. It is arranged to be retracted to the right as generally indicated by the chain line of the lifting hook in Figure 3, sliding along the guide bars 62 and 63 to move the lifting arms clear of the molds and avoid any possible collision with the molds as they are intermittently moved along the tracks. Movement of the carriage 61 is accomplished by an air cylinder 66 (Figure 11), through a piston 67 which is attached to the carriage 61. The cylinder 66 is fixed to the framework 64 and 65.

Referring to the Figures 3 and 6, there is shown a pair of lifting arms 68 which are pivoted to cranks 69. The arms 68 are reinforced by ribs 70 and the cranks 69 are similarly reinforced by ribs 71 (Figure 6). The cranks are shown in vertical position in Figure 6 and in horizontal position in Figure 3. The hubs of the cranks 69 are fixed to a shaft 72 which is journalled in bearings 73 and 74. A sprocket 75 is keyed to shaft 72 and is driven by a chain 76 from sprocket 77 which is keyed to the shaft of a motor 78. The motor 78 is of the reversing type so that after each operation its direction of rotation is changed. The motor includes a built-in brake 79 so as to avoid overrunning.

The lifting arms 68 are provided with hooks 80 (Figure 3) having openings adapted to receive the lifting lugs 81 which are provided on the opposite sides of each filling booth 27. A turn buckle 82 is disposed between each of the arms 68 and hooks 80 and these turn buckles are effective for adjusting the position assumed by the hooks 80 so that they properly engage the lifting lugs 81 when the carriage is moved into position and rotation is imparted to the cranks 69. This prevents any binding of the booth at the pins 29 which might occur if the booth were engaged by one of the hooks 80 prior to engagement with the lug 81 on the opposite side. In order to avoid binding, the booth should be lifted substantially vertically until it clears the pins 29.

A limiting device 83 is provided on each crank 69 to restrict swinging movement of the lifting arms 68. An adjusting screw 84 is provided on each limiting device 83 for properly determining the position the arms will assume when the cranks 69 are in the position shown in Figure 3 so that the hooks 80 will be automatically disengaged from the lugs 81 upon completion of movement of the cranks 69. Adjusting screws 85 are effective to similarly position the hooks 80 with respect to the lifting lugs 81 when the cranks 69 are in the opposite horizontal position and the hooks 80 are in the position shown by the dotted lines in Figure 3 and are ready for engagement to lift a filling booth from its mold. The screws 85 also prevent any swinging movement of the arms 68 which might bring them within the path of travel of the molds when the carriage is transversed to its inoperative position with the hooks 80 in the position shown in chain lines in Figure 3.

Figure 4:
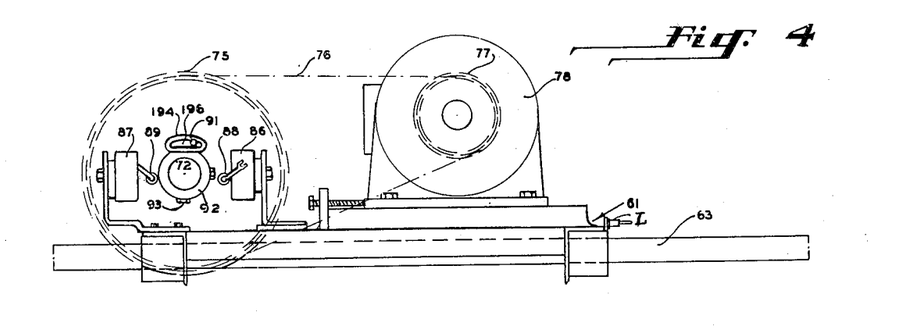
Figure 4 is a detail view illustrating the control arrangement for the filling booth lifts and mold turn-over.

A control arrangement is provided for automatically stopping the motor 78 when the cranks 69 are in the proper position for receiving or have discharged a filling booth and have completed their travel. This arrangement is best illustrated in Figures 4 and 6. It comprises essentially a pair of limit switches 86 and 87 having roller contacts 88 and 89, respectively. These switches are effective for stopping the motor 78 upon movement of either of the control arms to which the roller contacts 88 and 89 are connected. Control pins 90 and 91 are provided for engaging the contacts 88 and 89 to effect the necessary movement to interrupt the supply of current to the motor. These pins are mounted on an adjustable collar 92 which is secured to the shaft 72 by bolts 93. The shaft 72 imparts rotation to the cranks and lifting arms. The collar 92 is provided with a pair of spaced pin supports 194 and 195 which are slotted as indicated at 196 (Figure 4) to permit individual adjustment of the positions assumed by the pins 90 and 91, and a corresponding adjustment of the position at which the cranks 69 will rest when the motor 78 is stopped, the brake 79 being effective for preventing any substantial overrunning. The cranks 69 have a normal movement of about 180° to lift a filling booth 27 from a mold at rest in station 8 and place it upon the conveyor 10 as shown in Figure 3. The line M indicates the path of movement of the lifting hooks 80.

The operation of the lift is generally as follows: Air is supplied to the cylinder 66 causing the piston 67 to move to the left in Figures 3, 6, and 11. This brings the lifting hooks 80 from the inoperative position shown by the chain lines in Figure 3 to the operative position shown by the dotted lines in this view. The motor 78 is then started up and a counterclockwise rotation is imparted to the cranks 69 through shaft 72 lifting a filling booth from its mold. Rotation continues until pin 91 engages roller contact 89 (Figure 6), whereupon further movement is arrested. The lifting hooks 80 then assume the position shown in solid lines in Figure 3 and the booth 27 is free to roll on conveyor 10 to station 13. The motor 78 is then restarted and since it is a reversing type, a clockwise rotation will be imparted to the cranks 69 through the shaft 72 and this rotation will continue until the pin 90 engages the roller contact 88 of limit switch 86 whereupon the motor 78 will be stopped and the hook 80 will again assume the position shown in the dotted lines in Figure 3. (It should be borne in mind that there will be no filling both in station 8 for the molds are intermittently brought to rest in that station after a complete cycle of the lift.) Air will then be supplied to cylinder 66 causing piston 67 to be retracted and moved to the right, moving carriage 61 to a position where the lifting hooks 80 will clear the mold, as shown in chain lines in Figure 3. Thereupon, the drive band 5 will be rotated to bring another mold and filling booth into station 8 and the operation will be repeated.

The lift at station 13 operates in the same manner except that its cycle is to move the carriage in, rotate the crank 69 to pick up a filling booth from conveyor 10, reverse the rotation to deposit the filling booth on a mold, and then transverse to move the carriage and its associated mechanism out of the path of travel of the molds.

If desired, the traversing mechanism may be operated to bring the carriage 61 to its inoperative position simultaneously with the rotation of the cranks 69 to return the lifting hooks 80 to their normal position. Also, limit switches L, interlocked with the drive 6, may be provided to prevent rotation of the machine unless the carriages 61 have been traversed to their inoperative position.

The hydraulic press

Figure 8:
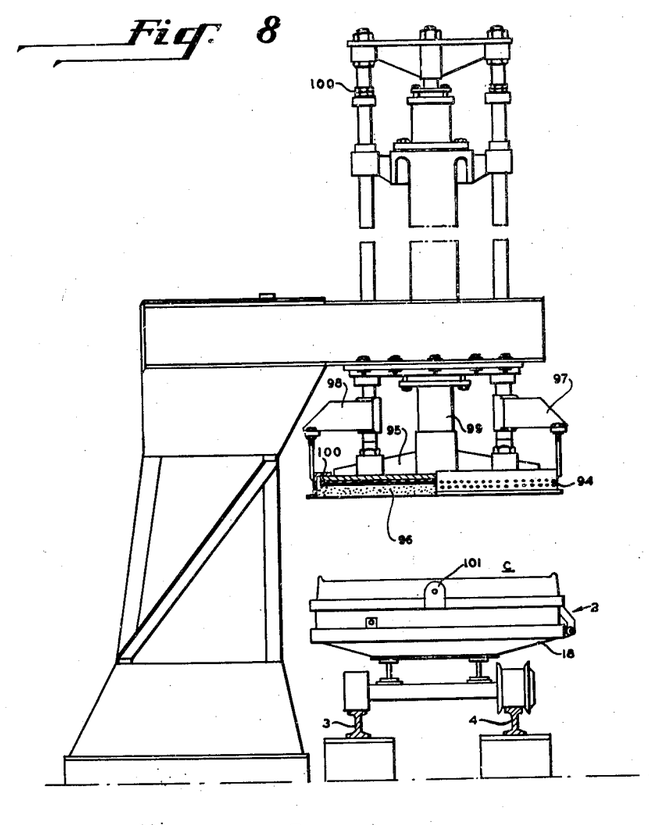
Figure 8 is a side elevation of a hydraulic press for operation upon a molded body, this view being partly broken away to illustrate the apron and platen arrangement.
Figure 9:
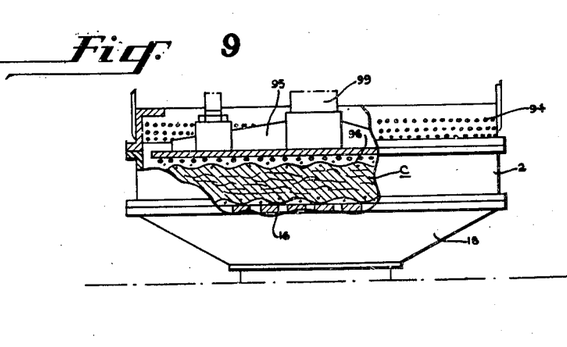
Figure 9 is a diagrammatic view showing the position assumed by the press platen and apron with respect to the mold upon completion of the pressure stroke with the mold screen and platen screen shown to exaggerated scale.

After the filling booth 27 is removed, the mold 2 is moved to station 9 where additional water is expressed from the body and it is reduced to the desired shape. This is accomplished by the hydraulic press shown in Figure 8. (It will be noted in this view that the cake C of slurry to be formed is deposited substantially entirely within the mold 2 and is of slightly irregular formation on the top.) The press includes a perforated apron 94 of a size corresponding to the size of the mold 2 and adapted to surround that portion of the cake which extends above the mold. Positioned within the apron 94 is a press platen 95 which has a wire screen face 96. The apron 94 is mounted on slides 97 and 98 so that it may be retracted upwardly with respect to the platen 95 upon engagement with the flange of mold 2 as shown in Figure 9. The platen 95 is attached to a ram 99 which is hydraulically actuated to apply pressure to the mass to be compressed.

In the operation of the press, the mold 2 is brought into position in station 9 and the ram is moved downwardly, first bringing the apron 94 into engagement with the flange of mold 2. As further downward movement of the ram 99 is effected, the platen 95 moves within the apron 94, the apron remaining in fixed position on the mold, but a sliding movement being effected on the slides 97 and 98. This movement of the platen reduces the cake and presses water from it. It will be observed that the sides of apron 94 are perforated so that the water may escape outwardly. As the application of pressure continues, water is expressed also through the perforate bottom 15 of the mold (see Figure 9). The downward motion of the ram 99 is limited by the adjusting nuts 100 so that when the platen 95 reaches its lowermost position, the cake is formed to the desired shape. The position assumed by the press platen is illustrated in Figure 9 where it is shown in its lowermost position. After compression has been effected, the ram 99 is elevated and when the platen 95 comes into engagement with the apron 94, the apron is lifted and the whole mechanism thereafter rises as a unit.

Figure 5:
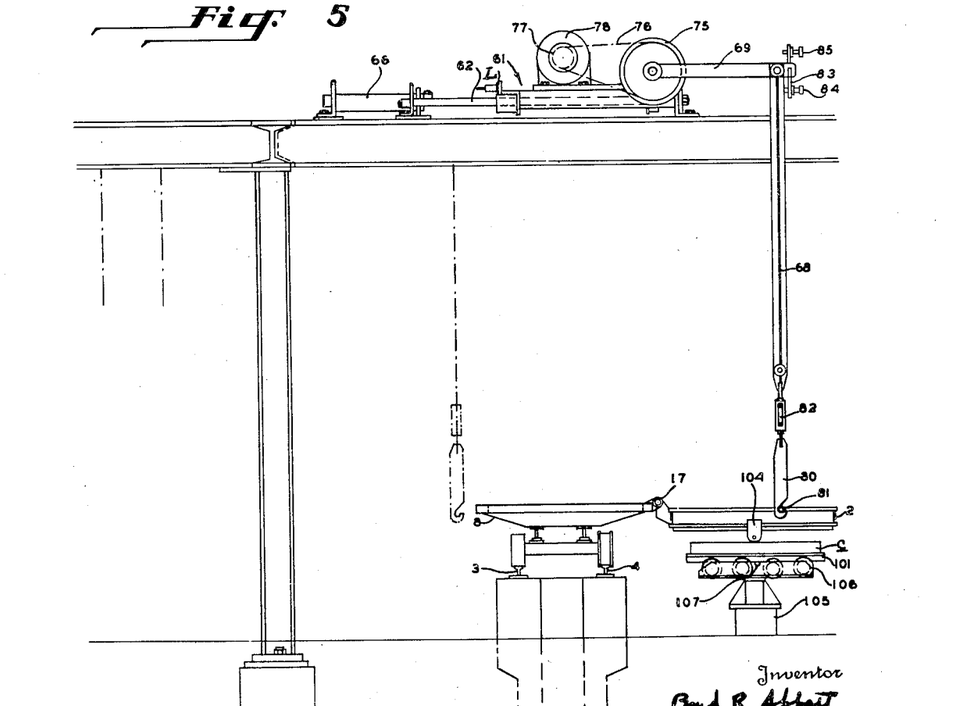
Figure 5 is a side elevation of the mold turn-over arrangement.

A supply of drying pallets 101 is fed along a conveyor 102, and one is picked up by an operator and fed over a roll 103 into position on top of the molded mass. A locking rod is then inserted through the openings in lugs 104 attached to the mold and this rod holds the pallet and the formed mass in position as the mold is turned over. (Figures 1 and 5.)

The mold turn-over

When the pressing operation and insertion and locking of the drying pallet have been effected, the mold is moved to station 11 where the mold is turned, the locking rod removed and the formed block on its drying pallet placed on conveyor 12 for delivery to the drying cars.

Figure 10:
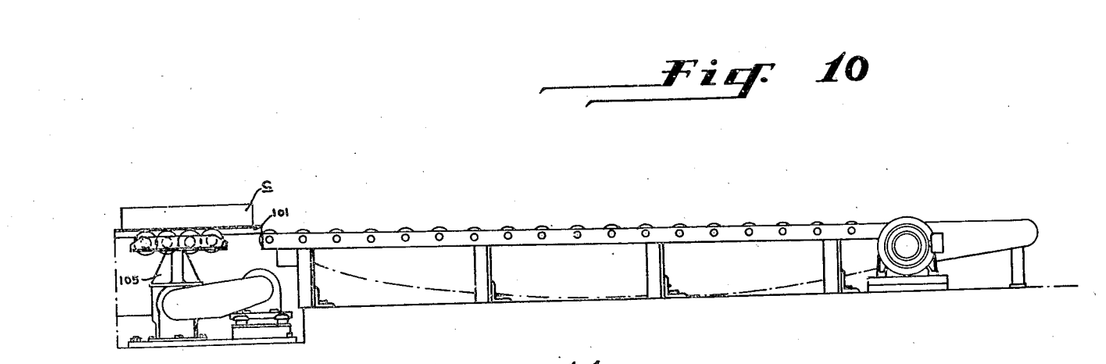
Figure 10 is a side elevation showing the drying platen elevator and conveying arrangement.

The mold turn-over mechanism is substantially the same as the filling booth lifts and is similarly mounted on a retractable carriage. Corresponding numbers have been applied to the corresponding parts shown in Figures 3 and 5. The mold turn-over is shown in Figure 5 and the filling booth lift in Figure 3. It will be noted that the turn-over mechanism is positioned inside the tracks 3 and 4 (Figure 1), whereas the filling booth lifts are positioned outside the track. By this arrangement, the turn-over equipment is always clear of the block elevator and conveying mechanism and permits freedom of movement for the operator in handling the discharged blocks. In Figure 5 the formed block B on the drying pallet 101 is shown in position on a mechanical elevator 105. The elevator is provided with rollers 106 to assist in movement of the blocks and pallets. The elevator 105 is shown in lowered position in Figure 5. In operation, the mold is turned over about the hinge 17 and the molded block B and drying pallet 101 are held in position within the mold 2 by the locking rod which passes through the lugs 104. The elevator 105 is raised to bring the rolls 106 into engagement with the lower side of the pallet 101 and to lift the weight of the pallet and block from the locking rod. The rod is received in a recess 107 provided in the top of the elevator. The rod is then withdrawn and the elevator is lowered with the formed block resting on the pallet. The mold 2 is then returned to its normal position by the mold turn-over and the carriage is retracted on the guides 62 and 63 to bring the lifting bar and hook out of the path of travel of the molds. The position assumed by the hook in its inoperative position is shown in chain lines in Figure 5. The molded block on its drying pallet is then rolled from the lift 105 onto the roller conveyor 12 which is shown in more detail in Figure 10, from where it is delivered to suitable drying cars. The cars are carried through a drying oven effective for driving off the water in the block and setting or converting the binder if one is employed.

After the block has been discharged and the mold returned to its initial position, the mold is moved to a position between the stations 11 and 13 where the screen in the bottom of the mold may be washed to remove the embedded fibers and fill the chamber 19 of the carriage for the purpose to be later described. Four shower heads S may be used for this purpose as shown in Figure 1. On the next move of the machine, the mold is delivered to station 13 where a filling booth is placed in position on the mold. The subsequent movement brings the mold and filling booth into station 7 where filling is accomplished and the entire cycle is repeated.

A product having an improved insulated value and a high modulus of rupture may be produced by providing an arrangement whereby the entire quantity of slurry is deposited into the filling tooth and mold prior to effecting drainage. Preferably, the slurry is deposited after the chamber 19 has been filled with water to a point above the screen 16. This may be conveniently effected by closing the valve 23 prior to cleaning the wire with the sprays 5 so that the cleaning water may be used to fill the chamber and when the water level rises to a position above the screen 16 the sprays may be cut off.

When a slurry is deposited into the mold and filling booth and free drainage is permitted, there is some tendency for the fibers to be condensed on the screen due to the impact of the slurry. There also appears to be some uneven distribution of the stock due to the washing effect, resulting in a nonuniform density in the finished product. Where the screen is covered with water prior to the charging of the mold and filling booth and the valve 23 is open after the entire charge has been deposited, the drainage of water is effected uniformly over the entire surface more gradually and as a result the fibers are permitted to felt uniformly and are not impacted and an unusually strong product of uniform density results.

Figures 16, 17:
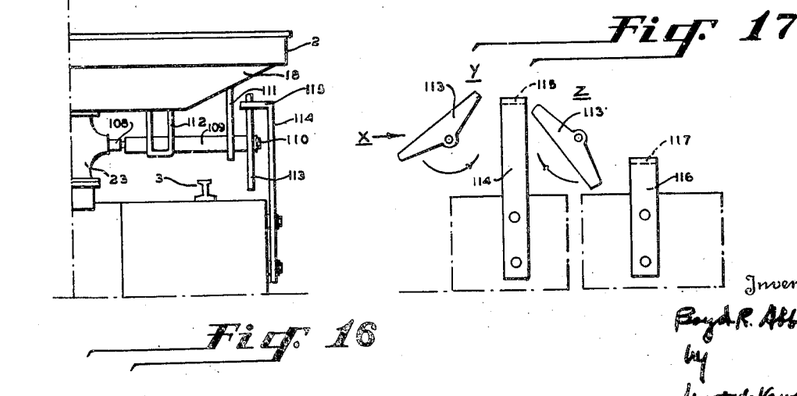
Figure 16 is a diagrammatic view of a device for automatically controlling the discharge of liquid from the slurry.
Figure 17 is a schematic view illustrating the mode of operation of the apparatus shown in Figure 16.

This procedure may be accomplished by the arrangement shown in Figures 16 and 17 which diagrammatically illustrate an arrangement for automatically opening and closing the discharge valves 23. The operating stem 108 of each valve 23 is provided with an extension 109 which is secured to the stem by a bolt 110. A bearing bracket 111 is provided for the extension 109 and is attached to the mold chamber 19. The axle support 112 is cut away to permit free passage of the extension 109 to a position between the track 4 (the wheel 26 has been omitted from Figure 16 in order that the valve arrangement may be clearly illustrated). A valve actuating dog 113 is secured to the extension 109 and is held in fixed position by the bolt 110 after proper adjustment has been obtained. A control bar 114 is positioned along the path of movement of the molds in such manner that its horizontally directed flange 115 will be engaged by the actuating dog 113 as the carriage moves past the location at which the control bar 114 is positioned. This is diagrammatically illustrated in Figure 17 where the actuating dog 113 is shown in the lefthand portion of this view in the position it assumes when the valve is closed and the position it assumes when the valve is opened in the righthand portion. When the carriage moves the actuating dog 113 into the engagement with the control bar 114, a counterclockwise rotation is imparted to the actuating dog 113 and to the valve stem 108 to which it is attached through the extension 109. Referring to Figure 17 and assuming that the carriage is moving in the direction of the arrow X, the dog 113 will be rotated from the position Y to the position Z upon engagement with the control bar 114. This is effective for opening the valve 23.

The control bar 114 is preferably positioned at a point immediately in advance of station 7, as indicated schematically in Figure 1. This insures that the valve 23 will be opened only after the mold and filling booth have been charged with the slurry and the carriage is moved toward station 8. As previously pointed out, the valve is closed prior to movement of the mold into the station where the screen is washed. An actuating bar 116, similar to the bar 114 is positioned in the path of travel of the carriages and as schematically shown in Figure 1 may be at a location which is immediately in advance of the shower station.

The lower half of the dog 113 engages the horizontal portion 117 of the control bar 116 and a clockwise rotation is imparted to the dog to return it from position Z to position Y. This is effective for closing the valve 23.

From the foregoing description, it will be clear that a dilute slurry is charged and substantially all drainage occurs through the bottom of the mold. This has been found to produce an insulating block of low conductivity and high strength. The product is considerably more uniform than would be obtainable using molds having perforations in the side as well as the bottom although the apparatus of this invention is suitable for use with such type molds.

While the machine has been illustrated using molds for the formation of insulating blocks, it may be used for other purposes such as, for example, the manufacture of pipe covering and fitting covers. This will, of course, necessitate changes in the shape of the molds and in the formation of the pressing platen, but in other respects, the machine will be substantially the same as that shown.

The mode of operation of the machine has been described in connection with the individual drawings and is briefly described as follows:

A mold with its associated filling booth is presented at filling station 7, with the chamber below the mold preferably filled with water and the valve closed. A measured quantity of slurry is deposited into the mold and filling booth. An intermittent motion is imparted to the train of molds and the mold which has been charged with slurry at station 7 advances in a stepwise manner along the path of travel. The valve is automatically opened just outside station 7 and drainage of water from the slurry takes place as the mold travels from station 7 to station 8. A substantial portion of the water is thus removed uniformly through the bottom of the mold. At station 8, the filling booth is removed and deposited on a gravity roller conveyor which delivers the booth to station 13. The mold with the filling booth removed is then moved to station 9 where pressure is applied to express further water and reduce the mass to the desired shape. This pressing operation may be dispensed with under certain circumstances, for example, where pressing is to be effected after the mass is removed from the mold. A drying pallet is positioned on top of the molded mass and held in position by a locking rod. The mold is then moved to the station 11 where the mold is rotated, an elevator is brought up, locking rod removed, and the formed block and its drying pallet lowered on said elevator. The mold is returned to its normal position. The block on the drying pallet is then rolled from the elevator onto a roller conveyor and delivered to drying cars. The valve in the carriage chamber is closed as the mold moves into the shower station where the screen is cleaned and the chamber filled with water to a point above the level of the screen in the bottom of the mold. On the next move, the mold is brought to station 13. Here a filling booth is lifted from the conveyor 10 and placed upon the mold which is then delivered to station 7 to complete the cycle of operation.

While I have illustrated and described a preferred embodiment of my invention, it will be understood that the same is not so limited but may be otherwise embodied and practiced within the scope of the following claims.

I claim:
1. In a rotary molding machine, a mold comprising a carriage mounted for rotation in a closed path, a mold body hinged to the carriage, and a filling booth removably secured to the mold body and rotatable therewith.

2. In a rotary molding machine, a mold arrangement comprising a mold carriage having a substantially fluid-tight chamber therein, a mold body having a perforate bottom hinged to said carriage and in substantially fluid-tight communication with said chamber, a filling booth associated with said mold body and forming substantially fluid-tight extension thereof, and a valve in said chamber for controlling the flow of liquid through said booth, mold body, and chamber, said chamber, mold body, and filling booth being rotatable as a unit on said mold carriage.

3. In a machine for the manufacture of mineral wool insulating blocks and the like from a liquid slurry, a trackway, a train of molds mounted on carriages for movement in a closed path about said trackway, a circular drive band connecting said molds for coincidental movement, lugs associated with said band, and a drive engageable with said lugs for imparting movement to said train of molds.

BOYD R. ABBOTT.

REFERENCES CITED

The following references are of record in the file of this patent:

UNITED STATES PATENTS

| Number | Name | Date |
|---|---|---|
| 870,006 | Wolfenden | Nov. 5, 1907 |
| 1,599,151 | Vought | Sept. 7, 1926 |
| 1,599,384 | O'Brien | Sept. 7, 1926 |
| 1,653,007 | Hall | Dec. 20, 1927 |
| 1,661,007 | Payne | Feb. 28, 1928 |
| 1,706,874 | De Journo | Mar. 26, 1929 |
| 1,907,207 | Laussucq | May 2, 1933 |
| 1,973,767 | Kimball et al. | Sept. 18, 1934 |
| 1,995,586 | Schopper et al. | Mar. 26, 1935 |
| 2,101,921 | Shaver | Dec. 14, 1937 |
| 2,156,310 | Schuh | May 2, 1939 |
| 2,352,991 | Vickery | July 4, 1944 |

FOREIGN PATENTS

| Number | Country | Date |
|---|---|---|
| 495,841 | Germany | Nov. 14, 1930 |
| 746,578 | France | Mar. 14, 1933 |
| 760,653 | France | Dec. 14, 1933 |